United States Patent [19]

Good et al.

[11] Patent Number: 4,735,274
[45] Date of Patent: Apr. 5, 1988

[54] AUTOMATIC PARALLEL PARKING SYSTEM

[76] Inventors: Warren T. Good, 8035 SW. 8th Ave., Portland, Oreg. 97219; Jacob E. Vilhauer, Jr., 3325 SW. 44th, Portland, Oreg. 97221

[21] Appl. No.: 800,709

[22] Filed: Nov. 22, 1985

[51] Int. Cl.$^4$ .......................... B60S 11/00; B62D 5/00
[52] U.S. Cl. ...................................... 180/204; 180/167
[58] Field of Search ............... 180/199, 204, 202, 167, 180/168, 169

[56] References Cited

U.S. PATENT DOCUMENTS

| | | | |
|---|---|---|---|
| 2,906,355 | 9/1959 | Hirsch | 180/204 |
| 2,978,056 | 4/1961 | Clements | 180/204 |
| 2,987,132 | 6/1961 | Reiter | 180/204 |
| 3,029,884 | 4/1962 | Clements | 180/204 |
| 3,097,716 | 7/1963 | Pfister | 180/204 |
| 3,097,717 | 7/1963 | Gilvarry | 180/204 |
| 3,117,642 | 1/1964 | Larinoff | 180/204 |
| 3,669,200 | 6/1972 | Odell | 180/204 |
| 4,558,760 | 12/1985 | Lestradet | 180/169 |

FOREIGN PATENT DOCUMENTS

| | | | |
|---|---|---|---|
| 2502773 | 10/1982 | France | 180/199 |
| 92257 | 5/1984 | Japan | 180/204 |

Primary Examiner—John J. Love
Assistant Examiner—Everett G. Diederiks, Jr.
Attorney, Agent, or Firm—Chernoff, Vilhauer, McClung & Stenzel

[57] ABSTRACT

A vehicular automatic parallel parking system adapted for installation either as a factory option or as a retrofit kit. A microprocessor-based controller exercises control over a hydraulic valve which regulates the fluid to the vehicle's power steering cylinder. Preferably the system controls the vehicle's standard power steering valve through a solenoid attachment, although a separate solenoid-operated valve in parallel with the power steering valve can be used in retrofit installations if necessary. By its sensing of rearward distance moved by the vehicle, the controller is able to control turning during a parallel parking maneuver through its regulation of the solenoid-operated valve. The turning parameters of the vehicle are adjustable in response to certain variable inputs, including the transverse distance separating the vehicle from the parked vehicle behind which it is desired to park, the longitudinal alignment of the two vehicles, relative length of the available parking space, and the width of the parked vehicle. Sensors automatically provide inputs representative of the transverse and longitudinal relationships between the driven vehicle and the parked vehicle.

8 Claims, 2 Drawing Sheets

AUTOMATIC PARALLEL PARKING SYSTEM

BACKGROUND OF THE INVENTION

The present invention relates to improvements in automatic parallel parking systems for vehicles such as automobiles, trucks and the like.

Because of the difficulty experienced by many drivers in properly executing a standard parallel parking maneuver, various systems have been proposed for enabling the vehicle to perform such maneuver automatically. For example, Hirsch U.S. Pat. No. 2,906,355 and Odell U.S. Pat. No. 3,669,200 show mechanical linkages powered by the drive train of the vehicle for automatically controlling steering while the vehicle executes the parallel parking maneuver in reverse gear. Such mechanical systems require major modification of the vehicle and are accordingly too expensive to be justified by the additional convenience which they provide. Also, they do not compensate for variables such as the transverse space separating the driven vehicle from the parked vehicle behind which it is desired to park, variations in the longitudinal alignment of the two vehicles at the beginning of the parking maneuver, variations in the width of the parked vehicle or variations in the length of the available parking space.

Another prior automatic parallel parking system, shown in Clements et al. U.S. Pat. No. 3,029,884, controls the standard power steering valve through cam-operated control of a reversible fluid pump which must be added to the system. This system, although utilizing the existing power steering arrangement, likewise requires the addition of substantial mechanical structure to the vehicle at substantial expense, and yet is also incapable of compensating for the variables mentioned above.

SUMMARY OF THE PRESENT INVENTION

The present invention overcomes the aforementioned drawbacks of prior automatic parallel parking systems by providing a system which preferably requires only the addition of electrical components to the standard hydraulic power steering system of the vehicle and which, even in a retrofit form for a vehicle for which such automatic parking option is not intended, requires only the further addition of a hydraulic valve in parallel with the existing power steering valve. Alternatively, the invention may be used with an electrically powered steering system if the vehicle is so equipped. Accordingly, the invention enables any vehicle to include an automatic parallel parking feature with only minimal, and relatively inexpensive, alteration at a cost low enough to be justified by the convenience of the feature.

In its form appropriate for installation as a factory option with a hydraulic power steering system, the system requires the addition of a bidirectional solenoid, or other suitable type of valve actuator, to the existing power steering valve to serve as an alternative controller for the valve when the automatic parking function is actuated. A microprocessor-based controller, which may be nothing more than an attachment to the existing microprocessor normally included in modern vehicles, controls the steering valve through the solenoid in response to distance traveled by the vehicle in reverse during the parking maneuver.

Preferably, the controller is capable of establishing different variable responsive relationships of the power steering system relative to the distance traveled in reverse, rather than merely a single responsive relationship. The ability to establish a variable, rather than fixed, response of the power steering system relative to vehicle travel is responsible for enabling the automatic parking system to compensate for the variables of transverse spacing and longitudinal alignment relative to the parked vehicle, variable width of the parked vehicle, and variable length of the parking space as mentioned above. By receiving inputs representative of these variables, the controller can combine them to variably limit the maximum turning angle (minimum turning radius) of the vehicle, or to vary the distance between the points where turning occurs during rearward travel, or both, to yield the optimum result.

The transverse and longitudinal relationships between the driven vehicle and the parked vehicle are preferably detected automatically by scanners of the electro-optical or other suitable type. The variables of width of the parked vehicle and length of the available parking space, on the other hand, are preferably supplied by driver input if they are relevant to a particular parking maneuver.

The foregoing and other objectives, features and advantages of the invention will be more readily understood upon consideration of the following detailed description of the invention, taken in conjunction with the accompanying drawing.

DESCRIPTION OF THE PREFERRED EMBODIMENT

Figure 1:
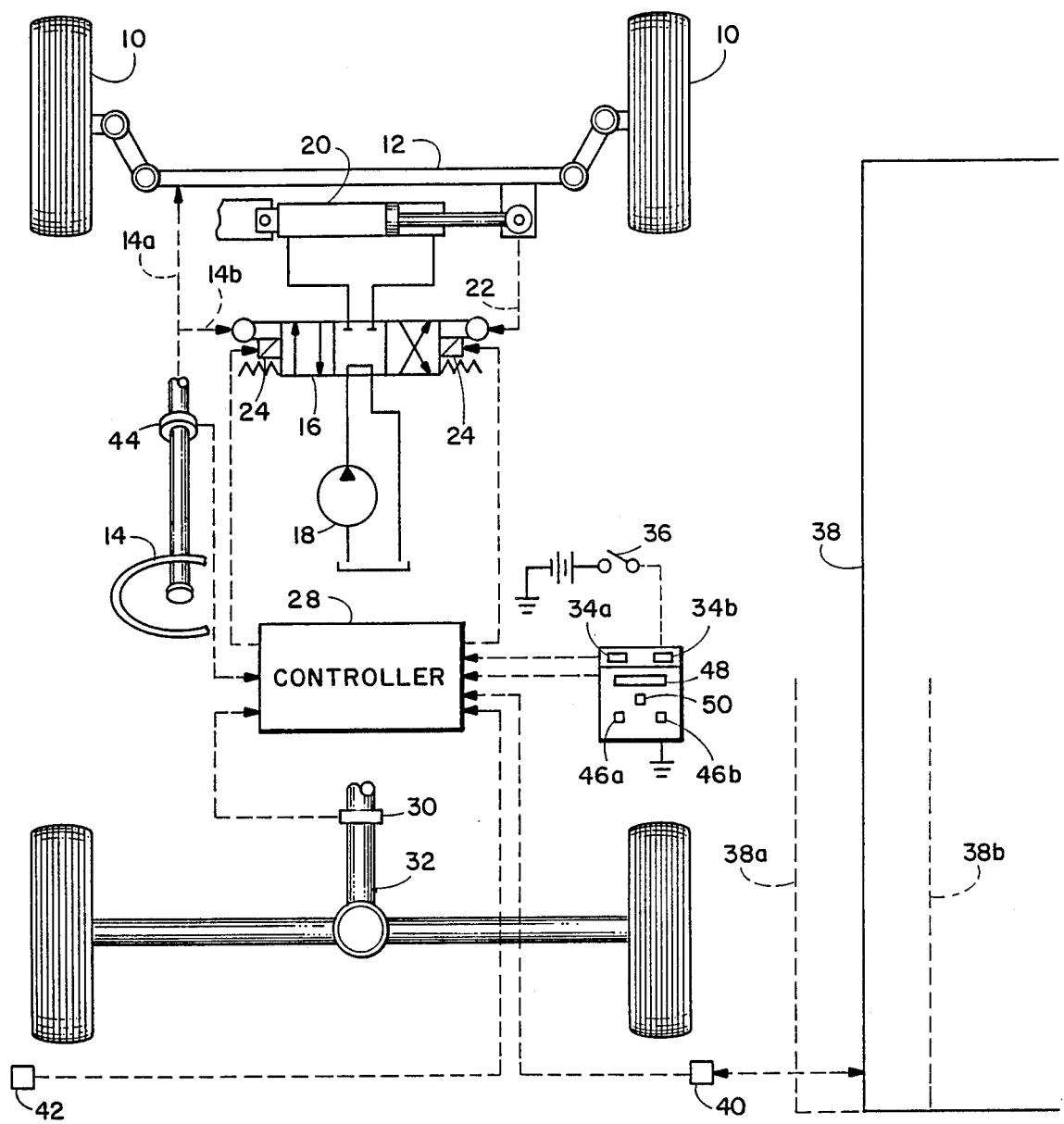
FIG. 1 is a schematic diagram of a vehicle equipped with an exemplary embodiment of the automatic parallel parking system of the present invention, shown in relation to a parked vehicle preparatory to execution of the parallel parking maneuver.

The standard elements of the vehicle shown in FIG. 1, which are normally present without any provision for the automatic parallel parking feature of the present invention, include the steerable front wheels 10 whose turning is controlled by transverse movement of a tie rod (or rack) 12 under power steering control of a steering wheel 14. Because there are currently many different arrangements for power steering systems, the arrangement in the figure is shown schematically so as to be representative of all such arrangements. Basically, all such power steering systems have both a mechanical control connection 14a and a hydraulic control connection 14b between the steering wheel 14 and the transverse rod or rack member 12. The hydraulic connection 14b controls the spool of a power steering valve 16, causing it selectively to direct hydraulic fluid from a pump 18 to one or the other side of a reversible hydraulic steering motor such as cylinder 20 which controls the transverse movement of the member 12. A mechanical connection 22 from the member 12 to the valve 16 provides negative position feedback counteracting the effect on the valve 16 of the steering wheel connection 14b, so that the steering is stable whenever the degree of turning of the wheels 10 corresponds to that commanded by the steering wheel 14. Examples of typical power steering systems which operate on this principle are described in the aforementioned U.S. Pat. No.

3,029,884, the disclosure of which is incorporated herein by reference.

Modification of the above-described standard hydraulic power steering system of the vehicle in accordance with the present invention requires either the addition of a bidirectional solenoid control 24 to the valve 16, or the connection of a solenoid-operated valve (not shown) in parallel with the valve 16. For installation of the invention as a factory option, it would be preferable that the standard power steering valve 16 be designed to accept the optional attachment of a bidirectional solenoid to its spool, in somewhat the same manner that the aforementioned U.S. Pat. No. 3,029,884 shows the attachment of a piston and cylinder assembly at one end of the valve spool for performing a similar function. Alternatively, for retrofit applications where the standard power steering valve is not adapted to accept a solenoid attachment, a separate solenoid valve may be installed in parallel with the standard valve. The bidirectional solenoid of either the standard valve 16 or the additional valve is controlled by a conventional microprocessor-based controller 28, which may constitute nothing more than an optional attachment to an existing microprocessor in the vehicle.

For the simplest embodiment of the present invention, which is capable of doing no more than the prior art devices described previously but at a much lower installation cost, the controller 28 requires the input from a sensor indicating distance traveled by the vehicle. Such sensor can be of any suitable type installed in any convenient location, such as a rotary encoder 30 connected to the drive shaft 32 which produces pulses for each increment of angular travel of the shaft 32. In such a simple system, the controller 28 would be actuated to commence the parallel parking maneuver in response to activation of one of two driver-controlled switches 34a and 34b (indicating whether the parking space is on the right or left-hand side of the vehicle). Such switches are in series with the transmission backup light switch 36 so that the switches cannot be activated unless the transmission is in reverse, and they are automatically deactivated when the transmission is taken out of reverse. After activation of one of the switches 34a or 34b, upon backing of the vehicle a first predetermined distance by the operator's normal control of the accelerator and brake pedal, and with the operator's hands removed from the steering wheel 14, the controller 28 would first shift the spool of the valve 16 or the aforementioned additional valve in parallel with the standard valve so as to cause the power steering cylinder 20 to turn the wheels 10 fully in one direction at a first turning point and, after a further predetermined rearward distance had been traveled as indicated by the sensor 30, would reverse the valve 16 at a second turning point causing the cylinder 20 to turn the wheels fully in the opposite direction.

However, although the scope of the present invention is broad enough to cover merely the capability of such a simple maneuver utilizing a microprocessor-controlled power steering system and/or solenoid-operated power steering valve, such function falls short of providing the versatility required by the different variables encountered by the vehicle. As stated previously, these variables include:

1. variable longitudinal alignment of the driven vehicle relative to the parked vehicle 38, behind which lies the intended parking space;
2. variable transverse distance separating the driven vehicle from the parked vehicle;
3. variable width of the parked vehicle; and
4. variable length of the parking space.

The first variable, i.e. longitudinal alignment of the driven vehicle with respect to the parked vehicle, is compensated for by a respective transverse distance sensor 40, 42 on each side of the driven vehicle adjacent its rear end. Each sensor, which can be of any available elctro-optical or sonic type, senses the transverse distance between the rear of the driven vehicle and the rear of a respective parked vehicle, such as 38, when the driven vehicle is initially located by its driver at a position where the sensor is somewhat forward of the rear end of the parked vehicle. As the driven vehicle begins backing, a point is reached where the respective sensor, such as 40, passes the rear end of the parked vehicle. At this point, the large change in transverse distance sensed by the sensor tells the controller 28 exactly where the driven vehicle is in longitudinal relationship to the rear extremity of the parked vehicle. Accordingly, the controller 28 begins counting pulses from the rotary position encoder 30 at this point, regardless of how far forward the driver initially positioned the driven vehicle relative to the parked vehicle, and thus commences the automatic parking maneuver at precisely the right longitudinal location relative to the parked vehicle. The controller 28 knows which sensor 40, 42 to respond to by the driver's initial actuation of switch 34a or 34b, indicating a left-hand parking situation or right-hand parking situation, rcspectively.

The second variable listed above, i.e. the variable transverse distance between the driven vehicle and the parked vehicle, is likewise compensated for by means of the transverse position sensors 40, 42. For example, signals from the appropriate sensor can inform the controller 28 as to the amount of transverse distance so that the controller may use such data to limit variably the maximum turning angle of the vehicle, at both turning points in the parking process, such angle tending to be greater if the transverse distance is large and lesser if the transverse distance is small. Variable control of the turning angle utilizes an additional sensor in the system, i.e. a sensor for sensing the turning angle. Such sensor may be connected in any convenient location to the steering linkage and may, for example, be another rotary position encoder such as 44 connected to the turnable steering column (whose rotary position corresponds to the turning angle of the vehicle). Alternatively, a linear or rotary position transducer located elsewhere in the steering linkage could be used. In any case, such turning angle sensor generates actual turning angle feedback signals which are compared, by a comparator or differential amplifier circuit in the controller 28, with variable turning angle command signals generated by the controller from all of its input data, thereby yielding a control signal to the solenoid-operated hydraulic valve which controls the power steering cylinder. It will be appreciated that the controller thus acts as a servo controller regulating the hydraulic valve in such a way as to minimize the difference between the turning angle feedback signals and the variable turning angle command signals.

An alternative to compensating for the aforementioned second variable, by variably limiting the vehicle turning angle in each direction at the appropriate turning points, would be to vary the distance between the first and second turning points which occur during the rearward travel of the vehicle, the second point tending to be further from the first turning point if the sensed transverse distance from the parked vehicle is large, and closer if the transverse distance is small. Of course a combination of variable maximum turning angles and variable distances between turning point locations could also be used for this purpose. In any case, the location of the second turning point is variably predetermined either by the first turning angle, or by the distance between the two turning points, or by a combination of both.

The third variable discussed previously, i.e. the variable width of the parked vehicle, is compensated for by driver input, if necessary. Under normal conditions, where the parked vehicle is of approximately the same width as the driven vehicle, there is no need for such compensation and the automatic parking system simply operates so as to align the street side of the driven vehicle with the street side of the parked vehicle when the parking maneuver is completed. However if the parked vehicle is of substantially different width, i.e. either substantially wider or narrower, than the driven vehicle as exemplified by the dashed lines 38a or 38b in FIG. 1, it will be necessary for the parking system to compensate for this variable so that the driven vehicle is not parked too far from the curb or in interference with curb. When the driver sees that the relative size of the vehicles requires the need for such compensation, he digitally depresses either key 46a (indicating a wider parked vehicle) or key 46b (indicating a narrower parked vehicle) a sufficient number of times to indicate, on a display 48, the approximate amount of width variation for which the controller must compensate. The controller 28 responds to this item of input data in the same way that it responds to transverse distance data by combining such data and variably determining the maximum turning angle of the vehicle, or varying the distance between the first and the second turning point, or both, in response to the combined result. In this case, an indication of a wider parked vehicle tends to increase the turning angle and/or increase the separation of the second turning point from the first, while an indication of a narrower parked vehicle tends to decrease these variables.

The fourth variable, i.e. variable length of the available parking space, again requires driver input if any compensation is to be made. For this purpose a digitally-actuated key 50 is provided enabling the driver to indicate on the display 48 the approximate distance, if any, by which the parking space is shorter than a normal space, which is translated by the microprocessor into a tendency for a progressively greater turning angle and/or a progressively earlier first turning point, for progressively shorter parking spaces. This variable, like the width of the parked vehicle, is input by the driver prior to initiating rearward motion of the vehicle, and is combined with the transverse distance variable to determine the resultant turning angle and/or turning point positions.

It will be appreciated that some embodiments of the invention may compensate for one or more, but not all, of the above-identified variables, or may compensate for such variables in different, but still equivalent, ways.

Figure 2:
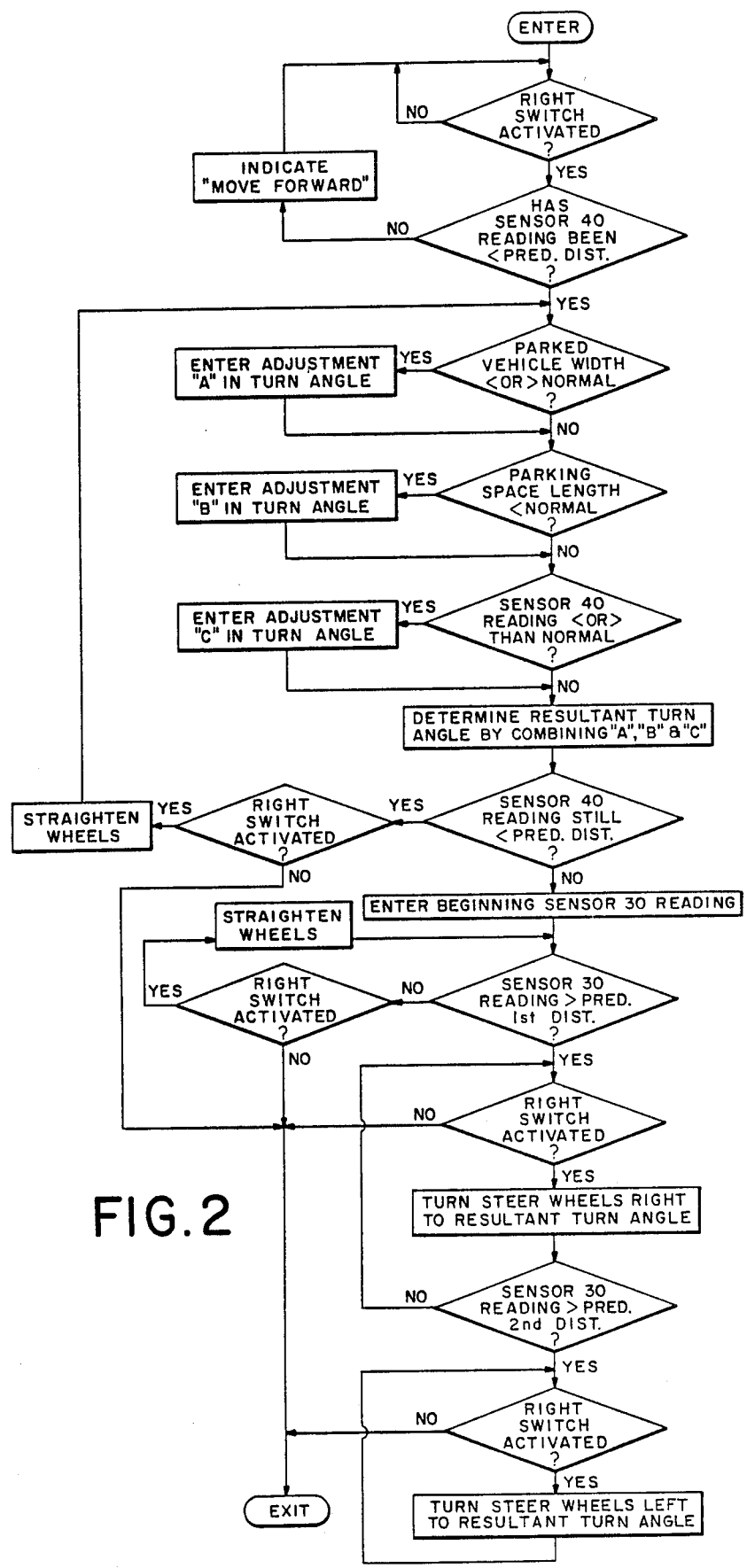
FIG. 2 is a logic flow diagram showing exemplary programming of the microprocessor-based controller of the present invention.

FIG. 2 is an exemplary logic flow diagram of the controller 28, showing the sequence of operations of maneuvering into a right-hand parking space, it being understood that a left-hand space utilizes corresponding logic for the opposite direction. Although FIG. 2, in the interest of simplicity, shows variable control of maximum turning angle as the only means of compensating for the above-described variables other than longitudinal alignment, variable control of the turning point positions as described above would utilize substantially the same logic pattern.

In the operation of the system according to FIG. 2, the driver positions his vehicle beside the parked vehicle so that its rear extremity is forward of that of the parked vehicle, places the transmission in reverse and activates the right switch 34b. The controller 28 determines whether the sensor 40 has sensed a distance less than a predetermined distance upon activation of the right switch 34b. If not, it indicates that the driven vehicle is not far enough forward, and a visual and/or audible "move forward" message is given, in response to which the driver must place the transmission in a forward gear and thereby deactivate the switch 34b. After the driver has moved the vehicle forward, he reactivates switch 34b and, assuming that sensor 40 now senses a distance less than the predetermined distance, the controller straightens the steerable wheels of the vehicle. The driver enters parked vehicle width adjustment data by means of key 46a or 46b and parking space length adjustment data by means of key 50, as applicable, and the controller translates these into adjustments in turning angle and combines them with the turning angle indicating from sensors 40b and 42b to obtain a resultant maximum turning angle. The driver then releases the steering wheel and begins backing the vehicle by normal control of the accelerator and brake. When the sensor 40 is no longer sensing a distance less than the aforementioned predetermined distance (indicating that a rear extremity of the parked vehicle has been passed) a beginning reading of sensor 30 is entered. Until this happens, the driver is able to enter and modify turning angle adjustment data if he wishes. When sensor 30 subsequently indicates a predetermined first amount of rearward travel (dependent on the dimensions of the driven vehicle), the controller turns the wheels 10 to the right to the aforementioned resultant maximum turning angle of the vehicle. When the sensor 30 indicates a larger, second predetermined amount of rearward travel (again dependent on vehicle dimensions), the controller turns the wheels 10 to the left to the same resultant turning angle. The automatic parking procedure is terminated whenever the switch 34b is deactivated either by manipulation of the switch or by taking the transmission out of reverse, regardless of whether the procedure has been completed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Automatic parallel parking apparatus for controlling the steerable wheels of a driven vehicle while such vehicle is moving in a rearward direction so as to position said vehicle behind a parked vehicle, said apparatus comprising:
    (a) power means for controlling the turning of said steerable wheels;

(b) sensor means for producing signals representative of the distance traveled by the driven vehicle in a rearward direction;

(c) controller means responsive to said signals from said sensor means and connected to said power means for controlling said power means so as to cause turning of said steerable wheels first in one direction and then in the opposite direction in response to rearward progress of said vehicle as sensed by said sensor means; and (e) manually-controlled data input means for entering variable data selected by the driver, said controller means including means variably responsive to said data for variably predetermining said response of said power means to said signals from said sensor means, said data input means comprising means for entering data representative of differences between the respective widths of said driven vehicle and said parked vehicle.

2. Automatic parallel parking apparatus for controlling the steerable wheels of a driven vehicle while such vehicle is moving in a rearward direction from a position alongside a parked vehicle spaced transversely therefrom to a position behind the parked vehicle, said apparatus comprising:

(a) power means for controlling the turning of said steerable wheels;

(b) controller means connected to said power means for controlling said power means so as to cause turning of said steerable wheels first in one direction and then in the opposite direction during movement of said driven vehicle in said rearward direction; and electronic scanning means mounted on said driven vehicle for sensing the presence of said parked vehicle and measuring the transverse distance between said driven vehicle and said parked vehicle while said driven vehicle is alongside said parked vehicle, said controller means including means variably responsive to said scanning means for variably predetermining at what point in the rearward path of travel of said driven vehicle, said steerable wheels are turned in said opposite direction, as a function of the measurement of said transverse distance by said scanning means.

3. The apparatus of claim 2 wherein said scanning means includes a pair of scanners located on opposite sides of said driven vehicle.

4. The apparatus of claim 2 wherein said scanning means includes means for sensing when said scanning means has passed the rear extremity of said parked vehicle during rearward movement of said driven vehicle.

5. Automatic parallel parking apparatus controlling the steerable wheels of a driven vehicle while such vehicle is moving in a rearward direction from a position alongside a parked vehicle spaced transversely therefrom to a position behind the parked vehicle, said apparatus comprising:

(a) power means for controlling the turning of said steerable wheels;

(b) controller means connected to said power means for controlling said power means so as to cause turning of said steerable wheels first in one direction and then in the opposite direction during movement of said driven vehicle in said rearward direction; and (c) electronic scanning means mounted on said driven vehicle for sensing the presence of said parked vehicle and sensing the passage of a predetermined rear portion of said driven vehicle beyond the rear extremity of said parked vehicle during rearward movement of said driven vehicle while alongside said parked vehicle, said controller means including means responsive to said scanning means for predetermining the rearward path of travel of said driven vehicle and for turning said steerable wheels from said first direction to said opposite direction, in response to the sensing of said passage by said scanning means.

6. The apparatus of claim 5 wherein said scanning means includes a pair of scanners located on opposite sides of said driven vehicle.

7. A method of parallel parking a driven vehicle having steerable wheels behind a parked vehicle by turning the steerable wheels of the driven vehicle first in one direction and then in the opposite direction while moving the driven vehicle rearwardly, said method comprising:

(a) positioning said driven vehicle alongside said parked vehicle spaced transversely therefrom;

(b) while said driven vehicle is alongside said parked vehicle, electronically measuring the transverse distance between said driven vehicle and said parked vehicle;

(c) variably predetermining the rearward path of travel of said driven vehicle by calculating the point along the rearward path at which said steerable wheels will be steered in said opposite direction, in response to the measurement of said transverse distance; and (d) causing said driven vehicle to follow said rearward path of travel, as predetermined in step (c), during the turning of said steerable wheels in said opposite direction.

8. A method of parallel parking a driven vehicle having steerable wheels behind a parked vehicle by turning the steerable wheels of the driven vehicle first in one direction and then in the opposite direction while moving the driven vehicle rearwardly, said method comprising:

(a) positioning said driven vehicle alongside said parked vehicle spaced transversely therefrom;

(b) initiating rearward movement of said driven vehicle;

(c) during said rearward movement and while said driven vehicle is alongside said parked vehicle, electronically sensing the passage of a predetermined rear portion of said driven vehicle beyond the rear extremity of said parked vehicle;

(d) predetermining the rearward path of travel of said driven vehicle by calculating the point along the rearward path at which said steerable wheels will be steered in said opposite direction, in response to the sensing of said passage; and (e) causing said driven vehicle to follow said rearward path of travel, as predetermined in step (d), during the turning of said steerable wheels in said opposite direction.

* * * * *

UNITED STATES PATENT AND TRADEMARK OFFICE
CERTIFICATE OF CORRECTION

PATENT NO. : 4,735,274

DATED : April 5, 1988

INVENTOR(S) : Warren T. Good; Jacob E. Vilhauer, Jr.

It is certified that error appears in the above-identified patent and that said Letters Patent is hereby corrected as shown below:

| | | |
|---|---|---|
| Col. 3, | Line 49 | Change "or" to --(or--; |
| | Line 51 | Change "valve" to --valve)--. |
| Col. 4, | Line 10 | Change "elctro-optical" to --electro-optical--. |
| Col. 5, | Line 26 | After "with" insert --the--. |
| Col. 6, | Line 29 | Change "indicating" to --indication--. |
| Col. 7, | Line 34 | After "and" insert --(c)--. |

Signed and Sealed this

Ninth Day of May, 1989

Attest:

DONALD J. QUIGG

*Attesting Officer*     *Commissioner of Patents and Trademarks*